United States Patent
Park et al.

(10) Patent No.: US 7,911,991 B2
(45) Date of Patent: Mar. 22, 2011

(54) APPARATUS AND METHOD FOR CONTROLLING DATA COMMUNICATION IN WIRELESS LOCAL AREA NETWORK

(75) Inventors: Jun Hyung Park, Anyang-si (KR); Yang Gi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 11/972,933

(22) Filed: Jan. 11, 2008

(65) Prior Publication Data

US 2008/0112348 A1 May 15, 2008

(51) Int. Cl.
*H04W 4/00* (2009.01)
(52) U.S. Cl. .................. 370/318; 370/338; 370/328
(58) Field of Classification Search .......... 370/231–235, 370/318, 328, 338, 363, 374; 455/574, 522, 455/412.1, 426.1, 432.3, 573
See application file for complete search history.

(56) References Cited

U.S. PATENT DOCUMENTS

| | | | |
|---|---|---|---|
| 5,301,225 A | 4/1994 | Suzuki et al. | |
| 5,560,021 A | 9/1996 | Vook et al. | |
| 5,705,929 A * | 1/1998 | Caravello et al. | 324/430 |
| 6,052,565 A | 4/2000 | Ishikura et al. | |
| 6,078,566 A | 6/2000 | Kikinis | |
| 6,108,316 A | 8/2000 | Agrawal et al. | |
| 6,192,230 B1 | 2/2001 | Van Bokhorst et al. | |
| 6,397,061 B1 | 5/2002 | Jordan et al. | |
| 6,879,826 B2 * | 4/2005 | Muramatsu | 455/423 |
| 2003/0050104 A1 | 3/2003 | Matsumura et al. | |
| 2003/0181163 A1 | 9/2003 | Ofuji et al. | |
| 2003/0190938 A1 | 10/2003 | Ganton | |
| 2003/0203741 A1 | 10/2003 | Matsuo et al. | |
| 2004/0002366 A1 | 1/2004 | Cromer et al. | |
| 2005/0009578 A1 | 1/2005 | Liu | |

FOREIGN PATENT DOCUMENTS

| | | |
|---|---|---|
| EP | 0553771 | 1/1993 |
| KR | 2000-0021530 | 4/2000 |
| KR | 10-2001-0007355 | 1/2001 |
| KR | 20010007355 | 1/2001 |
| KR | 1020040099021 | 11/2004 |
| WO | WO02/065262 | 8/2002 |

OTHER PUBLICATIONS

Korean Office Action.
Jin, Kyu-Tae, et al., "A MAC Algorithm for Energy-Limited Ad-hoc Networks," Vehicular Technology Conference, (2000), 1:219-222.

(Continued)

*Primary Examiner* — Jean A Gelin
(74) *Attorney, Agent, or Firm* — KED & Associates LLP

(57) ABSTRACT

An apparatus and method for controlling data communication in a wireless local area network (LAN) can check a remaining power level of a host computer battery and determine a data transmission characteristic such as a data transfer speed and/or power save mode period based on the checked battery power, and then adjust the current data transfer speed or power save mode period according to the determined value. For example, a controller of a wireless LAN can transmit information corresponding to the determined transmission characteristic to an access point or another station. Therefore, a station of the wireless LAN card can reduce or prevent power of the battery from being abruptly diminished because of use of the wireless LAN.

15 Claims, 8 Drawing Sheets

OTHER PUBLICATIONS

Luo, Jiong, et al., "Battery-Aware Static Scheduling for Distributed Real-Time Embedded Systems," Proceedings of the $38^{th}$ Annual Design Automation Conference, Jun. 18-22, 2001 38:444-449.
Korea Office Action dated Nov. 19, 2008.
European Search Report dated Oct. 31, 2005.
Notice of Allowance dated Jul. 25, 2007.
Korea Office Action dated Nov. 26, 2009.
IEEE Standard 802.11-1997.

* cited by examiner

BSS (Basic Service Set)

STA 2

STA 1

STA 3

Probe Request Frame

_Beacon frame body_

| Order | Information |
|---|---|
| 1 | Timestamp |
| 2 | Beacon interval |
| 3 | Capability information |
| 4 | SSID |
| 5 | Supported rates |
| 6 | FH Parameter Set |
| 7 | DS Parameter Set |
| 8 | CF Parameter Set |
| 9 | IBSS Parameter Set |
| 10 | TIM |

| B0 | B1 | B2 | B3 | B4 | B5 B6 | B7 - - B15 |
|---|---|---|---|---|---|---|
| ESS | IBSS | CF Pollable | CF Poll Request | Privacy | Transfer Speed | Reserved |

B5 B6 : 00 = 11 Mbps
B5 B6 : 01 = 5.5 Mbps
B5 B6 : 10 = 2 Mbps
B5 B6 : 11 = 1 Mbps

FIG. 6

Probe request frame body

| Order | Information |
|---|---|
| 1 | SSID |
| 2 | Supported rates |
| 3 | Transfer Speed |

B0 B1 : 00 = 11 Mbps
B0 B1 : 01 = 5.5 Mbps
B0 B1 : 10 = 2 Mbps
B0 B1 : 11 = 1 Mbps

_Beacon frame body_

| Order | Information |
|---|---|
| 1 | Timestamp |
| 2 | Beacon interval |
| 3 | Capability information |
| 4 | SSID |
| 5 | Supported rates |
| 6 | FH Parameter Set |
| 7 | DS Parameter Set |
| 8 | CF Parameter Set |
| 9 | IBSS Parameter Set |
| 10 | TIM |

| B0 - - B4 | B5 B6 | B7 - - B15 |
|---|---|---|
| - - - - | Power Save Period | - - - |

B5 B6 : 00 = 300 msec
B5 B6 : 01 = 400 msec
B5 B6 : 10 = 500 msec
B5 B6 : 11 = 650 msec

APPARATUS AND METHOD FOR CONTROLLING DATA COMMUNICATION IN WIRELESS LOCAL AREA NETWORK

BACKGROUND OF THE INVENTION

1. Field of the Invention

The present invention relates to an apparatus and method for controlling data communication in a wireless local area network (LAN).

2. Background of the Related Art

FIG. 1 is a block diagram showing the configuration of a related art portable computer. As shown in FIG. 1, the portable computer, such as a notebook computer has a central processing unit (CPU) 10, a display controller 11, a bridge chipset 12, a main memory 13, a read only memory (ROM) 14, a LAN controller 15, an embedded controller 16, a battery 17, etc.

The CPU 10 and the bridge chipset 12 are interconnected via a host bus, and the bridge chipset 12, the display controller 11 and the main memory 13 are interconnected via an accelerated graphics port (AGP) bus. The ROM 14, the LAN controller 15 and the embedded controller 16 are interconnected via a system bus.

The embedded controller 16 is connected with the battery 17 via a system management (SM) bus to check the remaining power of the battery 17. The LAN controller 15 is connected with a wireless LAN card 20 of the personal computer memory card international association (PCMCIA) card type to perform data communication using a wireless LAN. The LAN controller 15, for example, may be loaded in the form of a chipset on a system board in the portable computer to perform communication.

As shown in FIG. 2, each of a plurality of stations (STAs) of the wireless LAN card is connected with a portable computer that uses the battery 17, to wirelessly transmit and receive data directly in a basic service set (BSS) network. FIG. 2 shows an independent BSS as an ad hoc network. The stations of the wireless LAN card are adapted to transmit and receive data to/from one another using predefined probe request frames.

As shown in FIG. 3, on the other hand, different BSS networks BSS1 and BSS2 are connected with a distribution system (DS) network using different access points (APs) to construct an extended service set (ESS) network. Each AP and each STA are adapted to transmit and receive data to/from each other using predefined beacon frames. As a result, a STA of the wireless LAN card connected with the portable computer can wirelessly transmit and receive data directly to/from another STA included in an associated BSS network, and also to/from an STA in another BSS network existing in the ESS network via the DS network.

As described above, the related art apparatus and method for controlling data communication in a wireless LAN has various disadvantages. The STA of the wireless LAN card, connected with the portable computer, transmits and receives data to/from another STA or AP at a predetermined high transfer speed after completing an initial setup operation for data communication therewith. In other words, because the STA of the wireless LAN card connected with the portable computer is operated at a fixed transfer speed irrespective of external environments, a large amount of power is consumed in the battery of the portable computer, which results in significant reductions in available time of the portable computer. Further, data communication time of the battery powered portable computer can be reduced.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for controlling data communication in a wireless LAN.

Another object of the present invention is to provide an apparatus and method for controlling data communication in a wireless LAN coupled to a portable computer configured to use a battery that determines data transfer speed responsive to remaining power of the battery.

Another object of the present invention is to provide an apparatus and method for controlling data communication in a wireless LAN connected with a portable computer using a battery, whereby a station of a wireless LAN card determines a transfer speed corresponding to the remaining power of the battery and controls data communication with an access point or another station according to the determined transfer speed.

Another object of the present invention is to provide an apparatus and method for controlling data communication in a wireless LAN connected with a portable computer using a battery including a station of the wireless LAN that determines a power save period corresponding to the remaining power of the battery and controls data communication with an access point according to the determined power save period.

To achieve at least these objects and other advantages in a whole or in part and in accordance with the purpose of the invention, as embodied and broadly described herein, there is provided a method for controlling data communication in a wireless local area network (LAN) that includes checking a battery capacity using a first station and determining a transmission characteristic for a wireless LAN communication corresponding to the checked battery capacity.

To further achieve at least these objects and other advantages in a whole or in part and in accordance with the purpose of the invention, as embodied and broadly described herein, there is provided a method that includes receiving data communications from a plurality of stations on a wireless LAN network at an access point and determining priorities for data transmission and reception with reference to power save period information transmitted from the plurality of stations.

To further achieve at least these objects and other advantages in a whole or in part and in accordance with the purpose of the invention, as embodied and broadly described herein, there is provided an apparatus for controlling data communication in a wireless LAN that includes unit installed at a station of a wireless LAN card for checking the remaining power of a battery of a host computer connected through an interface, unit installed at the station for determining a transmission characteristic corresponding to the checked battery power and recording information corresponding to the determined transmission characteristic in a message to be transmitted to a receiving terminal and unit installed at the station for adjusting a data transmission characteristic with the receiving terminal to the determined transmission characteristic.

To further achieve at least these objects and other advantages in a whole or in part and in accordance with the purpose of the invention, as embodied and broadly described herein, there is provided an apparatus that includes a transmitting wireless LAN terminal coupled to a host computer and configured to determine remaining battery capacity of a host computer, wherein the transmitting station is configured to determine a transmission characteristic for a wireless LAN communication responsive to the remaining battery capacity.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a diagram showing the structure of an exemplary probe request frame recorded with transfer speed information according to a second embodiment of the present invention.

DETAILED DESCRIPTION OF PREFERRED EMBODIMENTS

Figure 4:
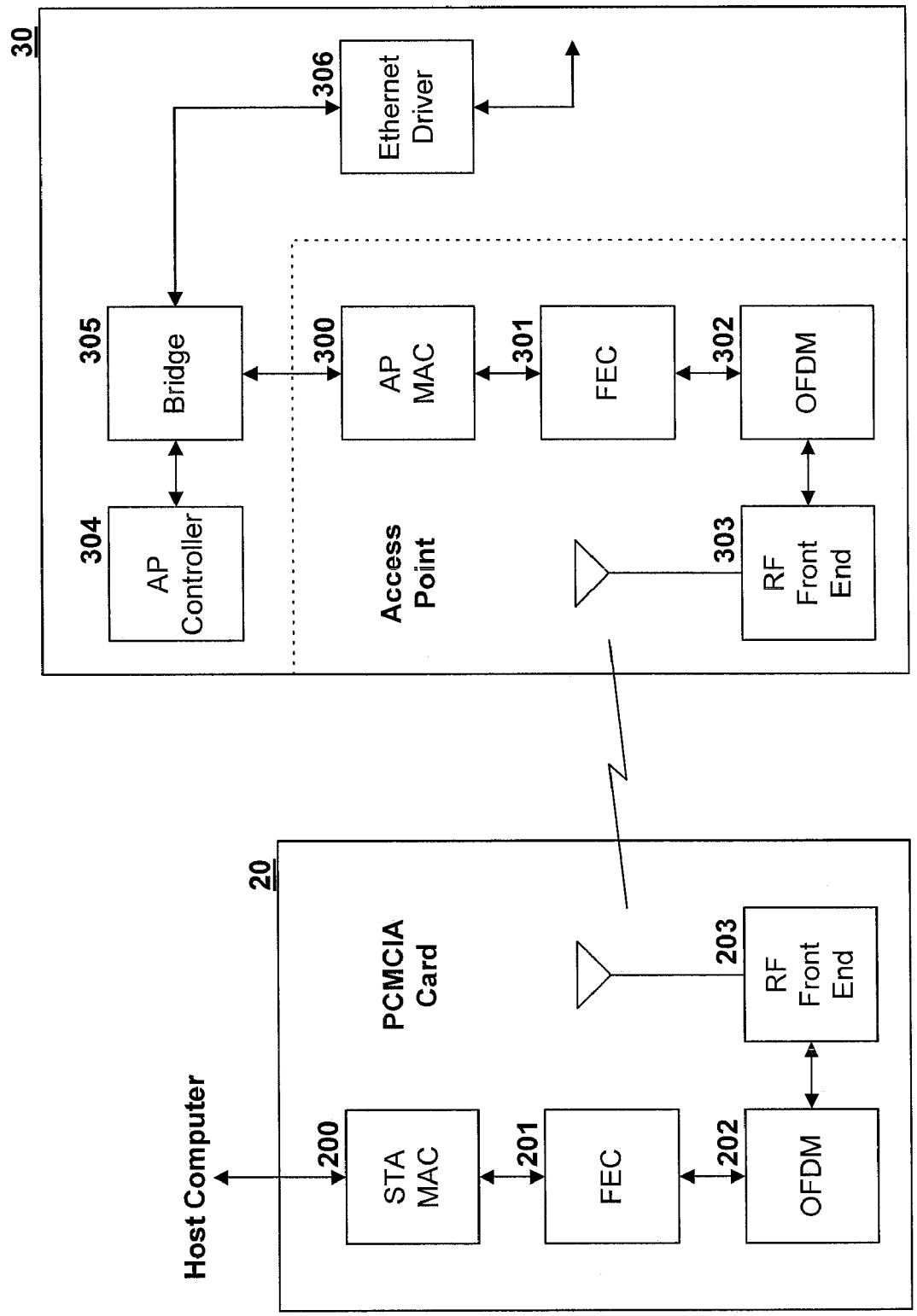
FIG. 4 is a block diagram showing a station and access point to which an apparatus and method for controlling data communication in a wireless LAN according to the present invention is applied.

An apparatus and method for controlling data communication in a wireless LAN according to embodiments of the present invention can be applicable to an access point (AP), a station (STA) or the like of a wireless LAN card coupled to a portable computer using a battery. As shown in FIG. 4, STA 20 of the wireless LAN card can include a station medium access control (STA MAC) unit 200, a forward error correction (FEC) unit 201, an orthogonal frequency division multiplexing (OFDM) unit 202, and a radio frequency (RF) front end unit 203. The STA MAC unit 200 can be coupled to a host computer, such as the portable computer.

The AP 30 can include an AP MAC unit 300, an FEC unit 301, an OFDM unit 302 and an RF front end unit 303. The AP MAC unit 300 can be coupled with an AP controller 304 and Ethernet driver 306 via a bridge chipset 305.

Figure 1:
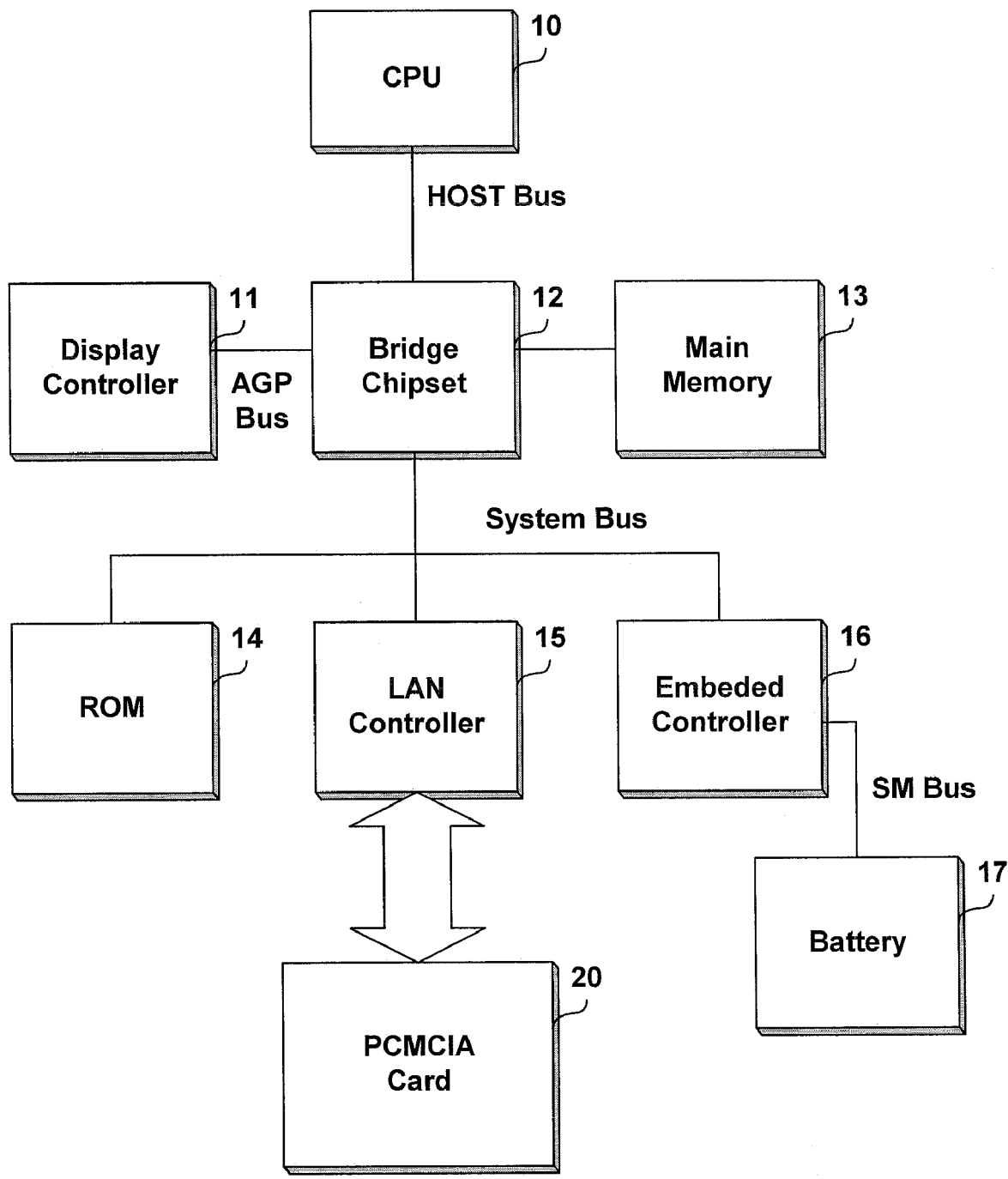
FIG. 1 is a block diagram showing the configuration of a related art portable computer.
Figure 2:
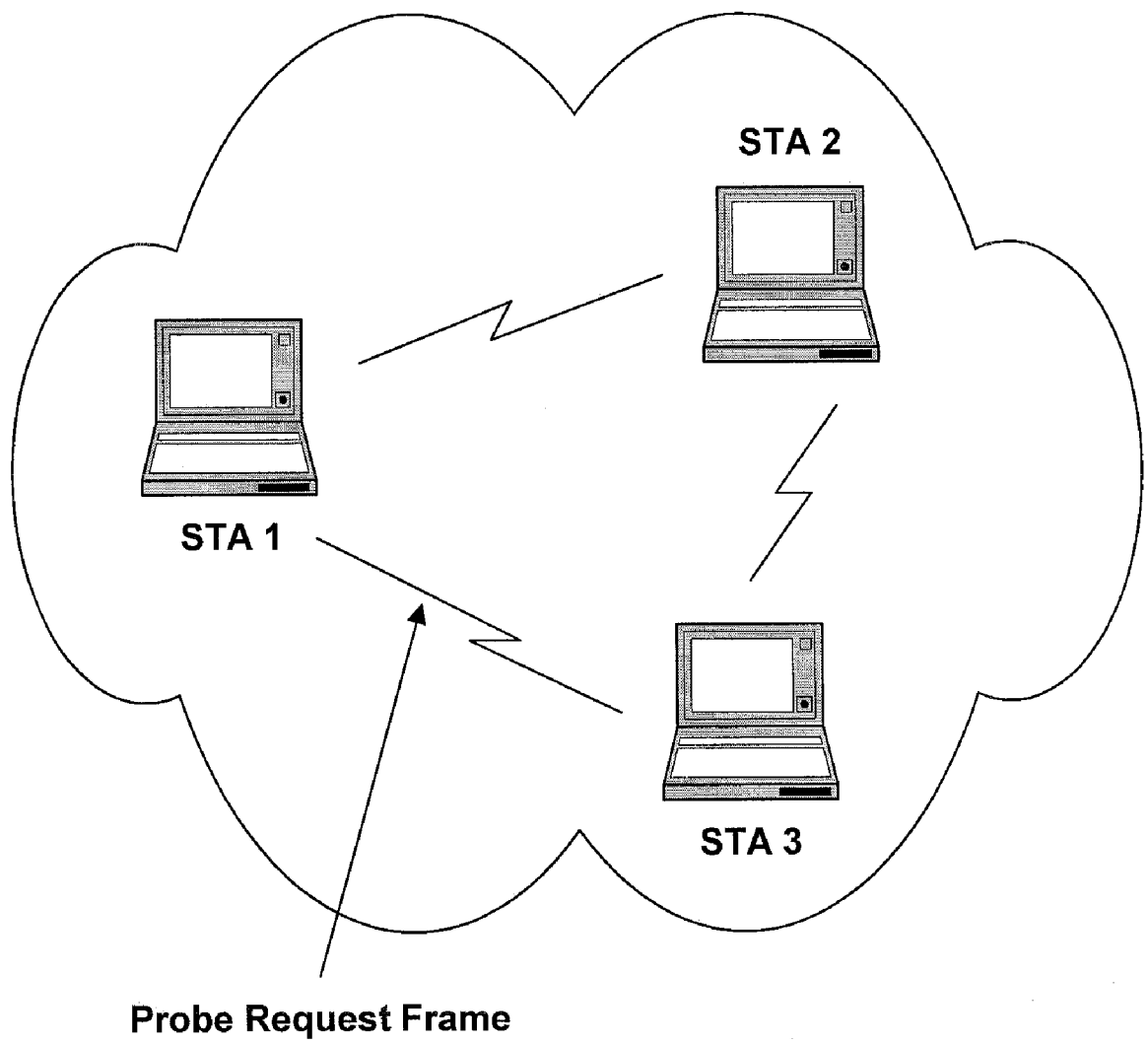
FIG. 2 is a diagram showing a configuration of a related art BSS network including a plurality of stations.
Figure 3:
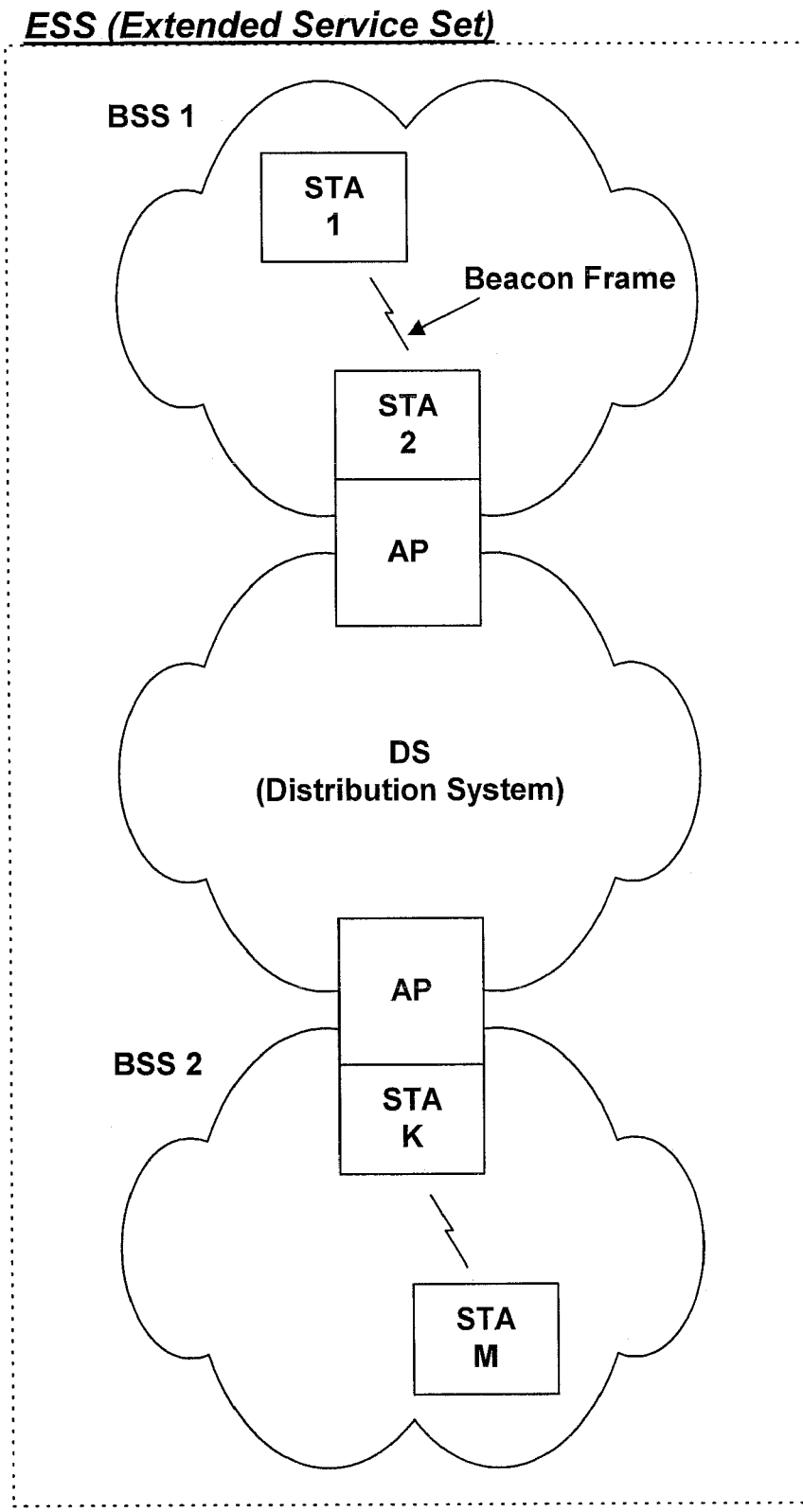
FIG. 3 is a diagram showing a configuration of a related art ESS network including a plurality of stations and a plurality of access points.

The STA 20 of the wireless LAN card can wirelessly transmit and receive data directly to/from another STA included in an associated BSS network using probe request frames as described above with reference to FIG. 2, which is in general an ad hoc mode, or wirelessly transmit and receive data to/from an AP included in an ESS network using beacon frames as described above with reference to FIG. 3, which is in general an infrastructure mode. For example, reference the ANSI/IEEE standard 802.11, 1999 Edition. According to embodiments of the present invention, the STA 20 of the wireless LAN card is adapted to check the remaining power of the battery through an interface with the portable computer and control a data transfer speed with other stations or access points appropriately according to the checked result for which exemplary embodiments of apparatus and methods will now be described.

As described herein, a battery of a portable computer is intended to include a single battery, a plurality of batteries or any type of battery pack or limited power source. Thus, embodiments of the present invention are intended to extend a performance time of portable computer not coupled to an AC power source or the like. However, power can be saved in alternative power modes according to embodiments of the present invention.

In a first embodiment of an apparatus and method for controlling data communication in a wireless LAN according to the present invention, after completing an initial setup operation for data communication with the AP, the STA 20 of the wireless LAN card can transmit and receive data at a predetermined high transfer speed. The STA 20 can check the remaining power of the battery through the interface with the portable computer during the data transmission and reception.

The STA 20 of the wireless LAN card can then determine the data transfer speed with the AP according to the checked battery power. For example, if the remaining battery power is 80% or more of the full level, the data transfer speed is preferably maintained at the predetermined high transfer speed, e.g., 11 Mbps. Alternatively, the data transfer speed is preferably determined to be a second rate e.g., 5.5 Mbps if the remaining battery power is within the range of 50 to 79% of the full level, a third rate e.g., 2 Mbps if it is within the range of 30 to 49%, and a lowest rate e.g., 1 Mbps if it is 29% or less.

Thereafter, the STA 20 of the wireless LAN card can provide the AP with the determined data transfer rate. For example, the STA 20 can convert the data transfer speed, determined in a multistage manner based on the remaining power of the battery as described above, into a corresponding unique code value recognizable by the AP, additionally record the converted code value in a beacon frame to be transmitted to the AP, and then transmit the resulting beacon frame to the AP.

Figure 5:
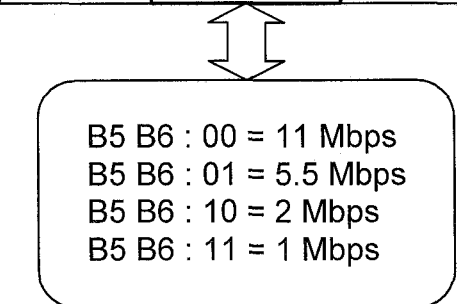
FIG. 5 is a diagram showing the structure of an exemplary beacon frame recorded with transfer speed information according to a first embodiment of the present invention.

For example, transfer speed information newly defined according to embodiments of the present invention can be assigned to prescribed bits such as two bits B5 and B6 in capability information contained in an exemplary bps beacon frame, as shown in FIG. 5. Accordingly, transfer speed information 'B5B6=00' can be additionally recorded in the capability information of the beacon frame if the data transfer speed determined according to the remaining power of the battery is 11 Mbps, and 'B5B6=01' can be additionally recorded in the capability information if the determined data transfer speed is 5.5 Mbps. Transfer speed information 'B5B6=10' can be additionally recorded in the capability information if the determined data transfer speed is 2 Mbps, and 'B5B6=11' if the determined data transfer speed is 1 Mbps. However, the present invention is not intended to be so limited.

Upon receiving the beacon frame transmitted from the STA 20, the AP can check a code value of the transfer speed information (e.g., B5 and B6) additionally recorded in the capability information of the received beacon frame. The AP can then adjust a data transfer speed with the STA 20 to a value corresponding to the checked code value. Using such an exemplary method, the STA 20 of the wireless LAN card can adjust the data transfer speed with the AP to a value determined according to the remaining battery power, so that it can carry out normal data communication with the AP and efficiently increase an available time or lifetime of the battery.

In a second embodiment of an apparatus and method for controlling data communication in a wireless LAN according to the present invention, after completing an initial setup operation for data communication with a selected or determined STA, the STA 20 of the wireless LAN card can transmit and receive data at a predetermined high transfer speed. Then, the STA 20 can check the remaining power of the battery through the interface with the portable computer during the data transmission and reception. The STA 20 of the wireless LAN card can then determines the data transfer speed with the selected STA according to the checked battery power. In a similar manner to the first embodiment, if the remaining battery power is 80% or more of the full level, the data transfer speed is preferably maintained at the predetermined high transfer speed, 11 Mbps. Also, the data transfer speed is preferably determined to be 5.5 Mbps if the remaining battery power is within the range of 50 to 79% of the full level, 2 Mbps if it is within the range of 30 to 49%, and 1 Mbps if it is 29% or less. However, the present invention is not intended to be so limited. For example, different ranges of battery power or data transfer speeds, and more or fewer ranges of battery power or data transfer speeds can be used.

Subsequently, the STA 20 of the wireless LAN card can convert the data transfer speed, determined in a multistage manner based on the remaining power of the battery as described above, into a corresponding unique code value recognizable by the selected STA, and record the converted code value in a probe request frame to be transmitted to the selected STA. Then, STA 20 can transmit the resulting probe request frame to the selected STA.

Transfer speed information can be, for example, 2 bits B0 and B1 newly defined according to embodiments of the present invention and can be assigned to an exemplary bps probe request frame, as shown in FIG. 6. Transfer speed information 'B0B1=00' can be recorded in the probe request frame if the data transfer speed determined according to the remaining power of the battery is 11 Mbps, and 'B0B1=01' can be recorded in the probe request frame if the determined data transfer speed is 5.5 Mbps. Also, transfer speed information 'B0B1=10' can be recorded in the probe request frame if the determined data transfer speed is 2 Mbps, and 'B0B1=11' can be recorded if the determined data transfer speed is 1 Mbps. However, the present invention is not intended to be so limited as different numbers of bits or codes can be used.

Thus, upon receiving the probe request frame transmitted from the STA 20, the selected STA can check a code value of the transfer speed information (e.g., B0 and B1) recorded in the received probe request frame, and adjust a data transfer speed with the STA 20 to a value corresponding to the checked code value. Preferably, after performing such operations, the STA 20 of the wireless LAN card can adjust the data transfer speed with the selected STA to a value determined according to the STA 20 corresponding remaining battery power, so that it can carry out normal data communication with the selected STA and increase or prolong an available time of the battery.

Figure 7:
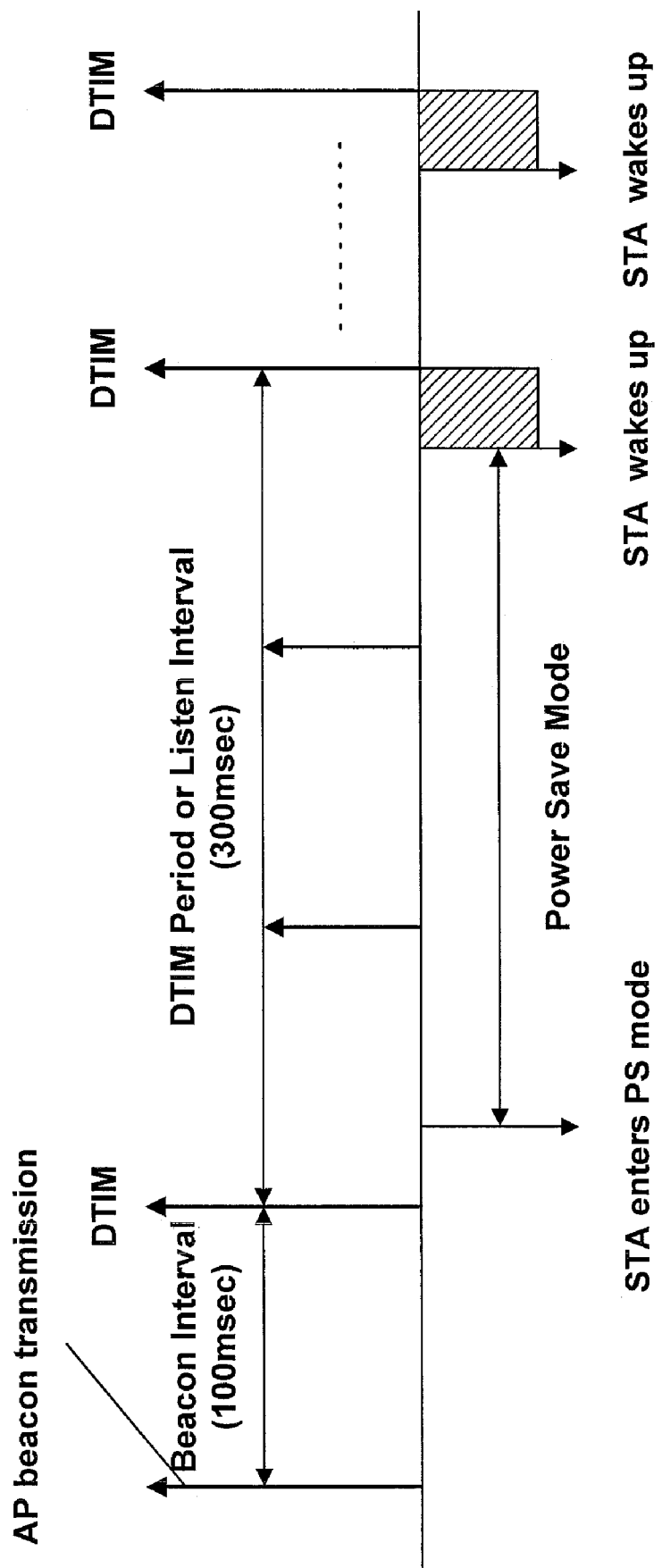
FIGS. 7 and 8 are diagrams showing a power save mode period variably set according to a third embodiment of the present invention and the structure of an exemplary beacon frame recorded with power save period information corresponding thereto, respectively.

Further, the STA 20 of the wireless LAN card can be adapted to determine whether there is valid data received from an AP. For example, the STA 20 can determine if there is valid data in a delivery traffic indication message (DTIM) signal transmitted from the AP as shown in FIG. 7. In the case where the STA 20 of the wireless LAN card is set to a power save mode, it preferably wakes up at an interval of a natural number multiple of a beacon interval to check the DTIM signal transmitted from the AP. According to preferred embodiments of the present invention, the STA 20 can set a wakeup period in consideration of the remaining battery power to increase the available time of the battery.

For example, in the power save mode, the AP transmits the DTIM signal at an interval of 100 msec, and the STA 20 wakes up at a period corresponding to about 300 msec to check the transmitted DTIM signal. According to a third embodiment or the present invention, the STA 20 of the wireless LAN card check the remaining power of the battery through the interface with the portable computer and adjust the power save mode period according to the checked battery power.

For example, if the remaining battery power is 80% or more of the full level, the power save mode period can be maintained at the initial value, 300 msec. Also, the power save mode period can be determined to be 400 msec if the remaining battery power is within the range of 50 to 79% of the full level, 500 msec if it is within the range of 30 to 49%, and 650 msec if it is 29% or less. However, the present invention is not intended to be so limited as more, less or different battery ranges and power save mode periods can be used.

Thereafter, the STA 20 of the wireless LAN card can convert the power save mode period, determined in a multistage manner based on the remaining power of the battery as described above, into a corresponding unique code value recognizable by the AP. The STA 20 can additionally record the converted code value in a beacon frame to be transmitted to the AP, and then transmit the resulting beacon frame to the AP.

Figure 8:
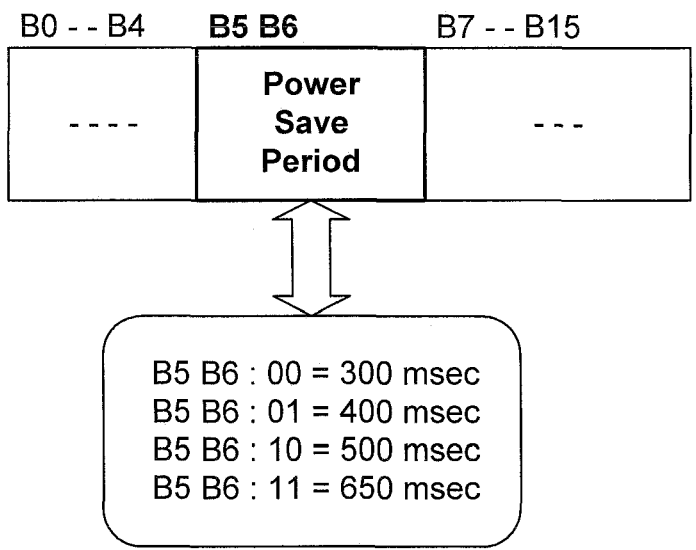

For example, as shown in FIG. 8, power save period information newly defined according to the third embodiment can be assigned to two bits (e.g., B5 and B6) in beacon interval information contained in a beacon frame. Exemplary power save period information 'B5B6=00' is additionally recorded in the beacon interval information of the beacon frame if the power save mode period determined according to the remaining power of the battery is 300 msec. 'B5B6=01' is additionally recorded in the beacon interval information if the determined power save mode period is 400 msec. Also, power save period information 'B5B6=10' is recorded in the beacon interval information if the determined power save mode period is 500 msec, and 'B5B6=11' is recorded in the beacon interval information if the determined power save mode period is 650 msec.

Upon receiving the beacon frame transmitted from the STA 20, the AP checks a code value of the power save period information (e.g., B5 and B6) additionally recorded in the beacon interval information of the received beacon frame, and can adjust a transmission period of the DTIM signal to be transmitted to the STA 20 to a value corresponding to the checked code value. Also according to embodiments of the present invention, the AP can recognize the respective remaining battery powers of a plurality of stations including the STA 20 from power save period information received from the stations and assign a highest priority for data transmission and reception to any one of the stations having a lowest one of the remaining battery powers.

Preferably, after performing such operations, the STA 20 of the wireless LAN card can adjust the power save mode period to a value determined according to the remaining battery power, so that it can carry out normal data communication with the AP. Thus, the STA 20 can increase the available time of the battery.

As described above, preferred embodiments used beacon frame and probe request frame messages. However, embodiments of the present invention are not intended to be so limited. For example, other messages or newly defined messages can be used so long as the corresponding information having a desired granularity can be included.

Any reference in this specification to "one embodiment," "an embodiment," "example embodiment," "first embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of an apparatus and method for controlling data communication in a wireless LAN have various advantages. Embodiments of the present invention can provide an apparatus and method for controlling data communication in a wireless LAN including a station of a wireless LAN card coupled to a portable computer using a battery that can reduce or prevent power of the battery from being abruptly reduced because of the wireless LAN and normally perform data communication with an access point or another station during such reduced power control. Further, embodiments can be applied to an ad hoc mode or an infrastructure mode of an wireless LAN.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling data communications, comprising:
    providing access to information identifying N transmission parameters, each parameter corresponding to a respective one of a plurality of battery power ranges;
    checking battery capacity of a first station;
        determining one of the battery power ranges that relates to the checked battery capacity; and
        controlling transmission of data between the first station and a second station or an access point, transmission of said data controlled based on the parameter that corresponds to said one of the battery power ranges that relates to the checked battery capacity, said method further comprising:
    converting the parameter that corresponds to said one of the battery power ranges into a code value; and
    transmitting the code value to inform the second station or access point that subsequent communications between the first station and second station or access point is to take place based on the converted parameter.

2. The method of claim 1, wherein the N transmission parameters are different data transfer speeds.

3. The method of claim 1, wherein said data is transmitted through a same network irrespective of which one of the N parameters is used to control transmission of said data.

4. The method of claim 1, wherein N≧2.

5. The method of claim 1, wherein N≧3.

6. The method of claim 1, wherein the code value is transmitted in a beacon frame.

7. The method of claim 1, wherein the code value is transmitted in a probe request frame.

8. The method of claim 1, wherein said checked battery capacity is of a host personal computer.

9. The method of claim 1, wherein said transmission parameter is a transmission power save period.

10. The method of claim 9, wherein said transmission save period is determined in a multistage manner based on said checked battery capacity.

11. A method, comprising: receiving data signals at an access point, each data signal including a code value that provides an indication of power save period information for a respective one of a plurality of stations; comparing the code values in the data signals; assigning a priority to at least one of the stations based on the comparison; recognizing remaining battery powers of said stations from said power save period information received from said stations; and assigning a highest priority for data transmission/reception to one of said stations having a lowest remaining battery power.

12. The method of claim 11, wherein the data signals are received from a wireless LAN network operating in an infrastructure mode.

13. An apparatus, comprising:
    a first terminal; and
    a controller within or coupled to the first terminal, the controller to:
    obtain access to information identifying N transmission parameters, each parameter corresponding to a respective one of a plurality of battery power ranges;
    check battery capacity of the first terminal;
    determine one of the battery power ranges that relates to the checked battery capacity; and
    control transmission of data from the first station, a second station, or an access point, the controller controlling transmission of said data based on the parameter that corresponds to said one of the battery power ranges that relates to the checked battery capacity, the controller further to:
    convert the parameter that corresponds to said one of the battery power ranges into a code value; and
    control transmission of the code value to inform the second station or access point that subsequent communications between the first station and second station or access point is to take place based on the converted parameter.

14. The apparatus of claim 13, wherein the transmission parameter includes at least one of a data transfer speed or a transmission power save period.

15. The apparatus of claim 10, wherein transmission of said data is performed through a wireless LAN operating in an ad hoc mode or an infrastructure mode.

* * * * *

UNITED STATES PATENT AND TRADEMARK OFFICE
CERTIFICATE OF CORRECTION

PATENT NO. : 7,911,991 B2
APPLICATION NO. : 11/972933
DATED : March 22, 2011
INVENTOR(S) : Jun Hyung Park and Yang Gi Kim Page 1 of 1

It is certified that error appears in the above-identified patent and that said Letters Patent is hereby corrected as shown below:

Title page insert items:

Related U.S. Application Data
--(62)   Continuation of application No. 10/810,690, filed on January
        11, 2008, now Pat. No. 7,356,014

(30)        Foreign Application Priority Data
Sep. 2, 2003        (KR)      10-2003-0060985--

Signed and Sealed this
Second Day of October, 2012

David J. Kappos
*Director of the United States Patent and Trademark Office*